US011048809B1

(12) United States Patent
Sun et al.

(10) Patent No.: US 11,048,809 B1
(45) Date of Patent: Jun. 29, 2021

(54) SYSTEMS AND METHODS FOR DETECTING MISUSE OF ONLINE SERVICE ACCESS TOKENS

(71) Applicant: Symantec Corporation, Mountain View, CA (US)

(72) Inventors: Yuqiong Sun, Mountain View, CA (US); Sandeep Bhatkar, Sunnyvale, CA (US); Susanta Nanda, San Jose, CA (US); Mingliang Pei, Palo Alto, CA (US)

(73) Assignee: NortonLifeLock Inc., Tempe, AZ (US)

( * ) Notice: Subject to any disclaimer, the term of this patent is extended or adjusted under 35 U.S.C. 154(b) by 372 days.

(21) Appl. No.: 16/130,254

(22) Filed: Sep. 13, 2018

(51) Int. Cl.
*H04L 29/06* (2006.01)
*G06F 21/62* (2013.01)
*H04L 29/08* (2006.01)

(52) U.S. Cl.
CPC .......... *G06F 21/62* (2013.01); *H04L 63/102* (2013.01); *H04L 63/108* (2013.01); *H04L 63/1416* (2013.01); *H04L 63/1425* (2013.01); *H04L 63/1441* (2013.01); *H04L 63/20* (2013.01); *H04L 67/22* (2013.01); *G06F 2221/2141* (2013.01)

(58) Field of Classification Search
None
See application file for complete search history.

(56) References Cited

U.S. PATENT DOCUMENTS

| 10,218,697 | B2 * | 2/2019 | Cockerill | ............ H04L 63/1433 |
| 2017/0310692 | A1 * | 10/2017 | Ackerman | .......... H04L 63/1425 |
| 2017/0310703 | A1 * | 10/2017 | Ackerman | .......... H04L 63/1425 |
| 2017/0359370 | A1 * | 12/2017 | Humphries | ............. H04L 63/10 |
| 2018/0004937 | A1 * | 1/2018 | Shannon | ............... H04L 9/0891 |

OTHER PUBLICATIONS

Gupta, Deepak; Gupta, Shikha. An efficient approach of trigger mechanism through IDS in cloud computing. 2017 4th IEEE Uttar Pradesh Section International Conference on Electrical, Computer and Electronics (UPCON). https://ieeexplore.ieee.org/stamp/stamp.jsp?tp=&arnumber=8251024 (Year: 2017).*

(Continued)

*Primary Examiner* — Jeremiah L Avery
(74) *Attorney, Agent, or Firm* — FisherBroyles, LLP

(57) ABSTRACT

The disclosed computer-implemented method for detecting misuse of online service access tokens may include (1) receiving a user permission token to access an online service that manages one or more user resources, (2) monitoring, based on utilization of the user permission token, usage data associated with an access token issued to a relying party for accessing the user resources managed by the online service, (3) identifying, based on the usage data, activity associated with the access token being misused by the relying party, and (4) performing, a security action that protects the user resources against the activity associated with the access token being misused by the relying party. Various other methods, systems, and computer-readable media are also disclosed.

20 Claims, 7 Drawing Sheets

(56) References Cited

OTHER PUBLICATIONS

Ghosh, Nimay et al. An Efficient Heuristic-Based Role Mapping Framework for Secure and Fair Collaboration in SaaS Cloud. 2014 International Conference on Cloud and Autonomic Computing. https://ieeexplore.ieee.org/stamp/stamp.jsp?tp=&arnumber=7024065 (Year: 2014).*

Chen et al., "OAuth Demystified for Mobile Application Developers", accessed at https://www.microsoft.com/en-us/research/wp-content/. . ./OAuthDemystitied.pdf, Accessed on Feb. 2016, 12 pages.

Fernandes et al., "Decentralized Action Integrity for Trigger-Action IoT Platforms", accessed at earlence.com/assets/papers/dtap_ndss18.pdf, accessed on Feb. 18, 2018, 16 pages.

Fernandes et al., "Security Analysis of Emerging Smart Home Applications", accessed at https://ieeexplore.ieee.org/document/7546527/%5D, retrived on Aug. 18, 2016.

* cited by examiner

SYSTEMS AND METHODS FOR DETECTING MISUSE OF ONLINE SERVICE ACCESS TOKENS

BACKGROUND

Enterprise and consumer digital and physical resources are increasingly being managed by online services. For example, social media and networking services may manage a user's digital resources such as professional contacts, friendships, and photographs. Similarly, content management and file sharing services may manage a user's professional and personal documents. Also, enterprise and home automation services may manage any number of a user's physical resources such as security systems, thermostats, lighting control devices, appliances, etc. Additionally, users may delegate access to their resources to third-parties to use certain online applications and/or to access enable functionality associated with resource use. For example, mobile entertainment applications may require users to delegate access to their social media accounts prior to being used. Similarly, various Internet of Things (IoT) services may require users to delegate access to online accounts for providing additional functionality to their IoT devices (e.g., turning off the oven if the thermostat detects that the temperature is over 90 degrees).

Unfortunately, third-parties granted access to user online services may often abuse this access, unbeknownst to the user, in a variety of ways. For example, untrustworthy third-parties may utilize user-provided access tokens longer than their intended use or in a manner exceeding desired use parameters due to the user forgetting or not being technically savvy enough to revoke or restrict use privileges associated with the access token. As another example, third-parties may unintentionally lose an access token to a malicious actor (e.g., due to a security breach). Traditional security systems are often designed to prevent identity theft by monitoring a person's physical identity usage online (e.g., use of social security numbers), but may have no means of detecting the abuse of user online digital or physical resources and further protecting against this abuse.

SUMMARY

As will be described in greater detail below, the instant disclosure describes various systems and methods for detecting misuse of online service access tokens.

In one example, a method for detecting misuse of online service access tokens may include (1) receiving, by one or more computing devices, a user permission token to access an online service that manages one or more user resources, (2) monitoring, by the one or more computing devices, based on utilization of the user permission token, usage data associated with an access token issued to a relying party for accessing the user resources managed by the online service, (3) identifying, by the one or more computing devices and based on the usage data, activity associated with the access token being misused by the relying party, and (4) performing, by the one or more computing devices, a security action that protects the user resources against the activity associated with the access token being misused by the relying party.

In some examples, the security action may include revoking the access token issued to the relying party. Additionally or alternatively, the security action may include disabling the access token issued to the relying party. In some embodiments, the usage data may be monitored by generating a query to the online service for the usage data and performing an analysis of the usage data to detect one or more suspicious uses of the access token.

In some examples, the query may include a request for a usage log generated by the online service for the usage data. Additionally or alternatively, the query may include a request for a callback from the online service upon the access token being used by the relying party. In some embodiments, the analysis of the usage data may include (1) detecting whether a use of the access token by the relying party exceeds a use threshold associated with a predetermined usage pattern, (2) detecting whether the use of the access token by the relying party includes use of a privilege outside of a set of use privileges in a privilege model associated with the relying party, and/or (3) detecting whether the use of the access token by the relying party includes a potential use of the access token by an additional unauthorized party. In some examples, the use threshold may be based on (1) a predetermined number of uses of the access token, (2) an expiration date associated with the access token, and/or (3) a hibernation state associated with the access token.

In some embodiments, the activity associated with the access token being misused by the relying party may include (1) exceeding a predetermined lifecycle associated with the access token, (2) accessing additional privileges beyond a predetermined set of privileges associated with the access token, and/or (3) determining a security breach associated with an exclusive use of the access token by the relying party. In some examples, the user permission token may be a restricted use token limited to querying the online service for the usage data. In some embodiments, the online service may be a digital resource online management service and/or a physical resource online management service.

In one embodiment, a system for detecting misuse of online service access tokens may include at least one physical processor and physical memory that includes a set of modules and computer-executable instructions that, when executed by the physical processor, cause the physical processor to (1) receive, by a receiving module, a user permission token to access an online service that manages one or more user resources, (2) monitor, by a monitoring module, based on utilization of the user permission token, usage data associated with an access token issued to a relying party for accessing the user resources managed by the online service, (3) identify, by an identification module, based on the usage data, activity associated with the access token being misused by the relying party, and (4) perform, by a security module, a security action that protects the user resources against the activity associated with the access token being misused by the relying party.

In some examples, the above-described method may be encoded as computer-readable instructions on a non-transitory computer-readable medium. For example, a computer-readable medium may include one or more computer-executable instructions that, when executed by at least one processor of one or more computing devices, may cause the one or more computing devices to (1) receive a user permission token to access an online service that manages one or more user resources, (2) monitor, based on utilization of the user permission token, usage data associated with an access token issued to a relying party for accessing the user resources managed by the online service, (3) identify, based on the usage data, activity associated with the access token being misused by the relying party, and (4) perform, a security action that protects the user resources against the activity associated with the access token being misused by the relying party.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
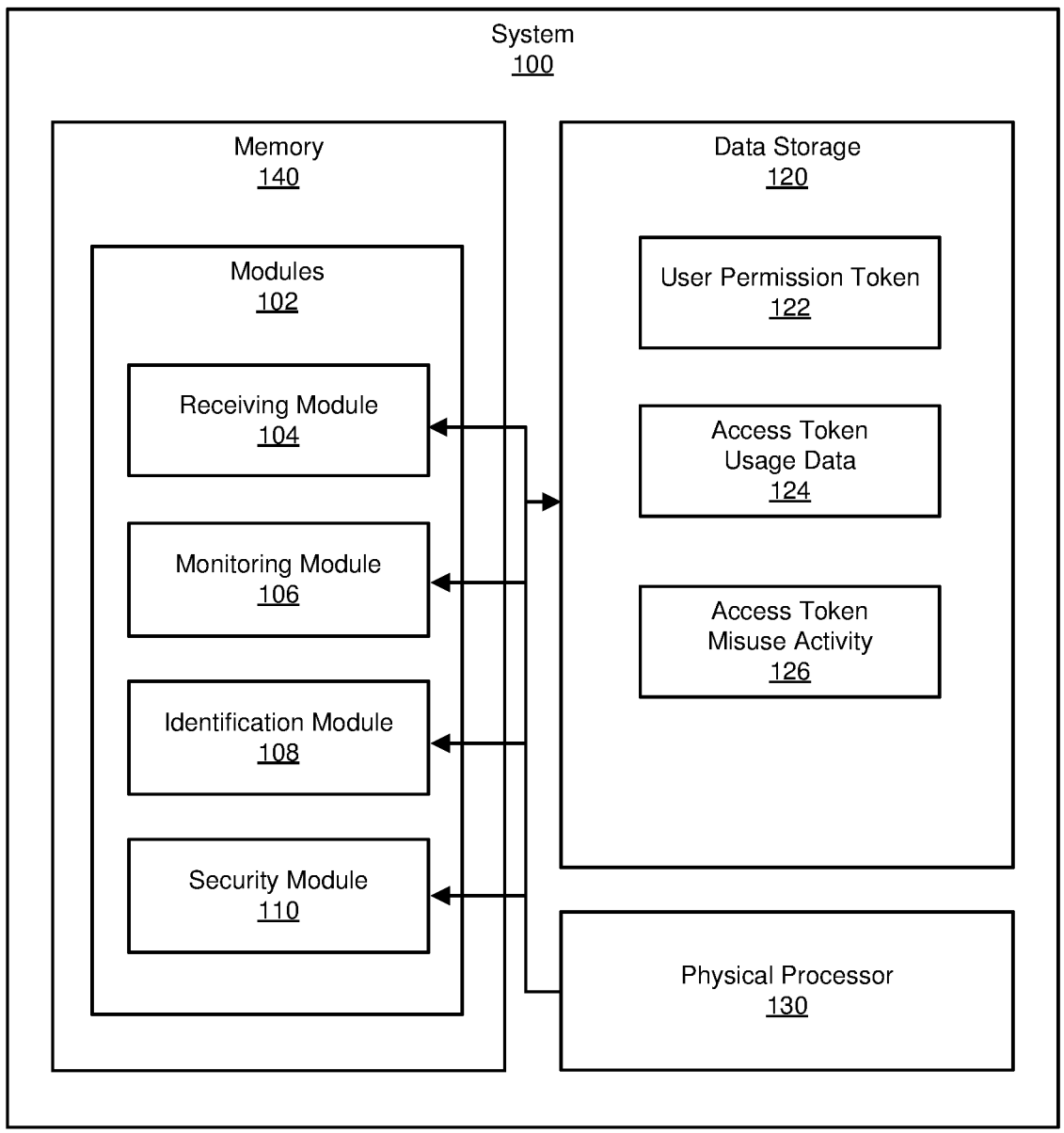
FIG. 1 is a block diagram of an example system for detecting misuse of online service access tokens.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting misuse of online service access tokens. As will be explained in greater detail below, by monitoring usage data associated with an access token issued to a third-party for accessing the user online resources, the systems described herein may detect token misuse and protect the user online resources against undesired and/or potentially malicious activity associated with the misuse.

In addition, the systems and methods described herein may improve the functioning of a computing device by reducing the computing device's susceptibility to attack through the misuse of access tokens associated with user online services. Detecting ownership of access tokens by untrustworthy third-parties before an attack is initiated and further disabling the access tokens, may prevent malicious actors from causing harm to users' computing systems through token misuse.

Figure 2:
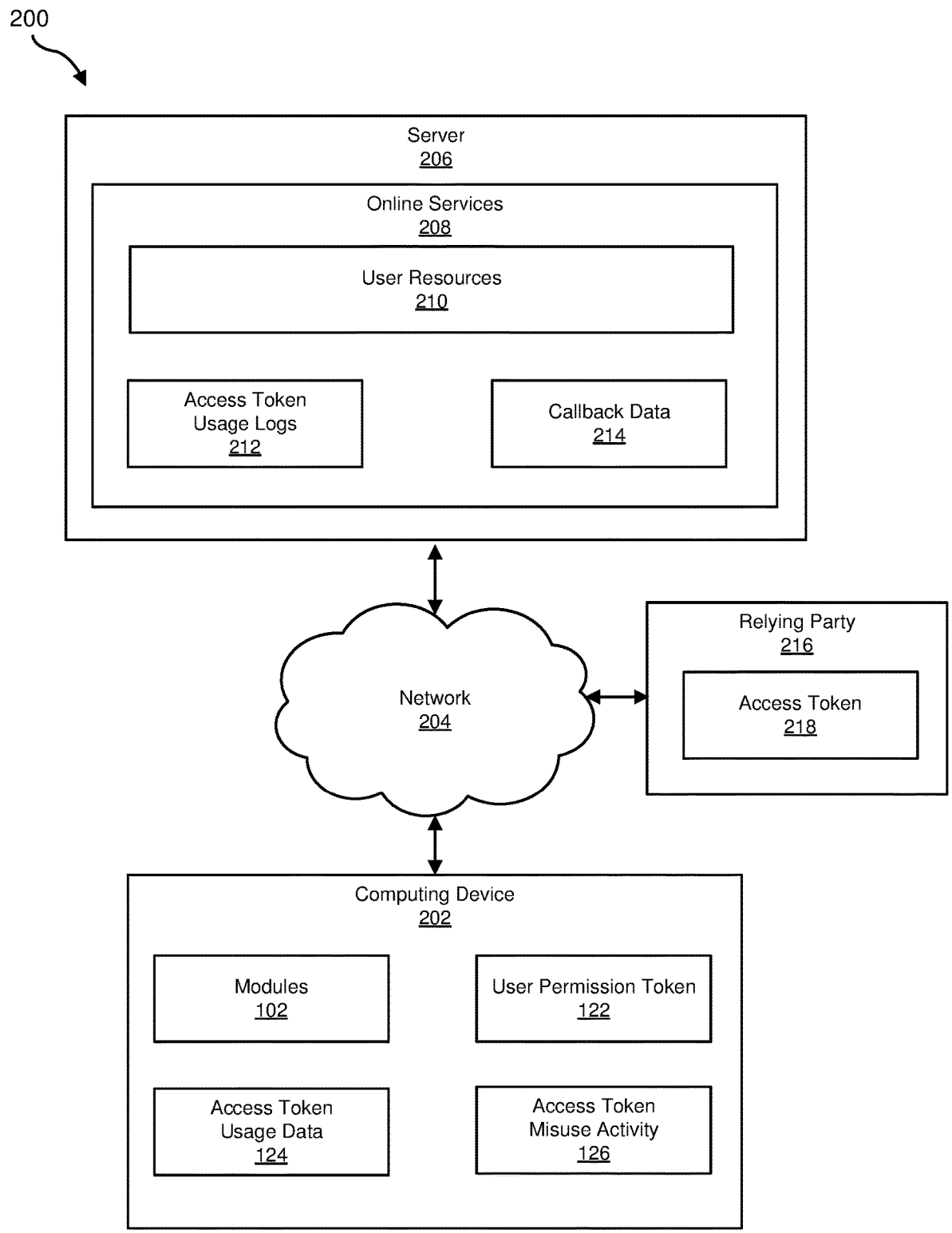
FIG. 2 is a block diagram of an additional example system for detecting misuse of online service access tokens.

The following will provide, with reference to FIGS. 1-2, detailed descriptions of example systems for detecting misuse of online service access tokens. Detailed descriptions of corresponding computer-implemented methods will also be provided in connection with FIG. 3. Detailed descriptions of access token usage data and access token misuse activity in an example system for detecting misuse of online service authorization tokens will also be provide in connection with FIGS. 4 and 5, respectively. In addition, detailed descriptions of an example computing system and network architecture capable of implementing one or more of the embodiments described herein will be provided in connection with FIGS. 6 and 7, respectively.

FIG. 1 is a block diagram of an example system 100 for detecting misuse of online service access tokens. As illustrated in this figure, example system 100 may include one or more modules 102 for performing one or more tasks. For example, and as will be explained in greater detail below, example system 100 may include a receiving module 104 that receives a user permission token 122 to access an online service that manages one or more user resources. Example system 100 may also include a monitoring module that monitors, based on utilization of user permission token 122, access token usage data 124 associated with an access token issued to a relying party for accessing the user resources managed by the online service. Example system 100 may additionally include an identification module that identifies, based on access token usage data 124, access token misuse activity 126 associated with the access token being misused by the relying party. Example system 100 may also include a security module that performs a security action that protects the user resources against the activity associated with the access token being misused by the relying party. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting misuse of online service access tokens. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120. In some examples, data storage 120 may be utilized to store user permission token 122, access token usage data 124, and data including access token misuse activity 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 and a relying party 216 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to detect misuse of online service authorization tokens.

Computing device 202 generally represents any type or form of computing device capable of reading computer-executable instructions. In some embodiments, computing device 202 may represent an endpoint computing device running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of providing online services 208 for managing user resources 210. In some embodiments, server 206 may represent one or more application servers that provide online social networking, professional networking, and/or document management services for managing digital user resources such as social networking data, professional networking data, and/or user documents. Additionally or alternatively, server 206 may represent one or more application servers that provide services for managing physical user resources such as Internet of Things (IoT) devices, home or business automation devices, etc. Additional examples of server 206 include, without limitation, security servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Access token usage logs 212 generally represents any type or form of computing log file that records events or transactions between two parties. In some examples, access token usage logs 212 may record instances of access token 218 being utilized by relying party 216. Callback data 214 generally represents any type or form of data returned in response to a callback function (e.g., executable code utilized to perform a specific function). In some examples, callback data 214 may include data associated with the use of access token 218 by relying party 216, that may be returned in response to a callback function registered by monitoring module 106.

Relying party 216 generally represents any type or form of computing device that is capable of reading computer-executable instructions. In some embodiments, relying party 216 may represent a client or server computing device that is delegated, by a user of computing device 202, to receive and access token 218 for accessing user resources 210 on online services 208. In some examples, relying party 216 may be an application server providing a digital distribution platform for applications that may request access token 218 for accessing user digital resources (such as social or professional online network account access) for use. Additionally or alternatively, relying party 216 may be one or more applications servers, hosting a cloud-based platform, that may request access token 218 for accessing user physical resources (such as security systems, thermostats, lighting control devices, appliances, etc.) for providing enterprise and/or home automation services utilizing various trigger-action logic functions to control the user physical resources over a network. Access token 218 generally represents any type or form of authorization protocol that may be utilized to grant delegated third-party access to server resources on behalf of a resource owner, without the sharing of credentials (e.g., user passwords). In some examples, access token 218 may be a protocol authorizing relying party 216 to access user resources 210 on online services 208. In some examples, access token 218 may be granted for a predetermined time period (e.g., a token lifecycle) and restricted to one or more usage categories (e.g., token privileges), by a user. In some embodiments, access token 218 may be represented by an OAuth token which is an open standard for access delegation.

Network 204 generally represents any medium or architecture capable of facilitating communication or data transfer. In one example, network 204 may facilitate communication between computing device 202, server 206, and relying party 216. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
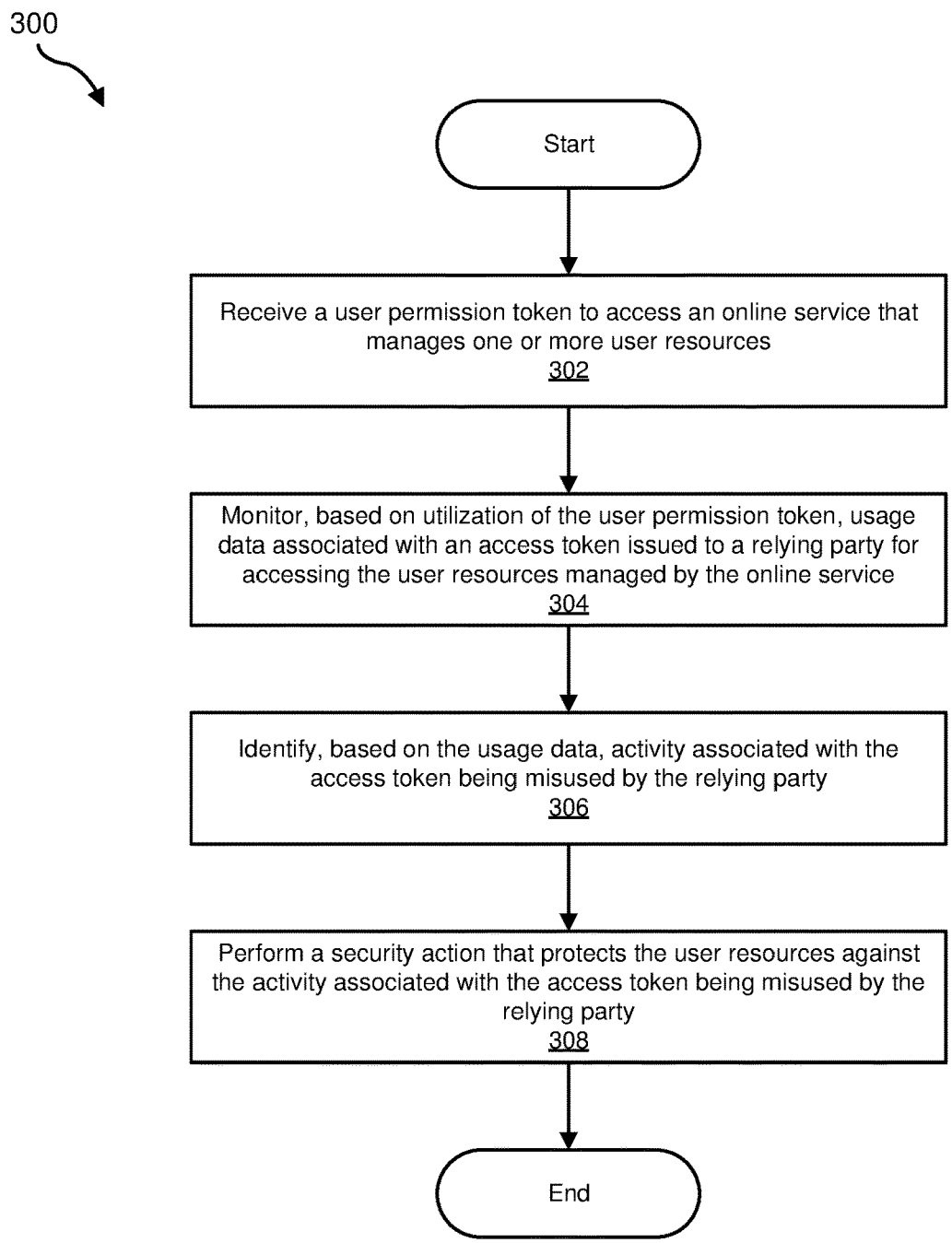
FIG. 3 is a flow diagram of an example method for detecting misuse of online service access tokens.

FIG. 3 is a flow diagram of an example computer-implemented method 300 for detecting misuse of online service access tokens. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a user permission token to access an online service that manages one or more user resources. For example, receiving module 104 may, as part of computing device 202 in FIG. 2, receive user permission token 122 to access online services 208 that manage user resources 210 on server 206.

Receiving module 104 may receive user permission token 122 in a variety of ways. In some examples, receiving module 104 may be configured to request, from server 206, a restricted use token (e.g., user permission token 122) that is limited only to querying online services 208 for access token usage data 124 generated by the use of access token 218, by relying party 216. In one embodiment, user permission token 122 may be a least privilege token that only grants the recipient the capability it needs to search through access token usage logs 212. Access token usage logs 212 may be maintained by online services 208 and include data regarding how access token 218 is being used.

At step 304, one or more of the systems described herein may monitor, based on utilization of the user permission token, usage data associated with an access token issued to a relying party for accessing the user resources managed by the online service. For example, monitoring module 106 may, as part of computing device 202 in FIG. 2, monitor, based on utilization of user permission token 122, access token usage data 124 associated with access token 218 issued to relying party 216 for accessing user resources 210 managed by online services 208.

The term "access token usage data," as used herein, generally refers to any data related to actions taken by an access token user with respect to the access and/or management of user resources for an online service. In some examples, access token usage data may include data related to the usage of an access token delegated by the owner of a user account to a third-party such that the third party may access and/or manage the user's online resources. In one example, the data related to the usage of the access token may be reflected in one or more usage logs generated by an online service. In another example, the data related to the usage of the access token may be reflected in callback data received by a user computing device in response to a function call issued to a server hosting an online service.

Monitoring module 106 may monitor access token usage data 124 in a variety of ways. For example, monitoring module 106 may generate a query to online services 208 for access token usage data 124 and then perform an analysis of access token usage data 124 to detect one or more suspicious uses of access token 218. In one embodiment, the query generated by monitoring module 106 may be a request for access token usage logs 212 generated by online services 208. In some examples, monitoring module 106 may obtain access to access token usage logs 212 without requesting them from online services 208. For example, online services 208 may be configured to implement transparency logs (e.g., similar to the certificate transparency logs) on when access tokens are issued and used. In this example, monitoring module 106 may be configured to parse through the transparency log to detect access token misuse. Additionally or alternatively, the query generated by monitoring module 106 may be a request for callback data 214 from online services 208 when access token 218 is being used by relying party 216.

In some examples, monitoring module 106 may analyze access token usage data 124 by detecting whether a use of access token 218 by relying party 216 exceeds a use threshold associated with a predetermined usage pattern. For example, monitoring module 106 may, based on a query of access token usage logs 212, determine if access token 218 has exceeded an associated token lifecycle utilizing multiple heuristics. In this example, monitoring module 106 may determine a token usage pattern (e.g., one time, many times, or an estimated expiration date) based on the nature of relying party 216. For example, relying party 216 may be an accounting services entity that only needs to access a user's online financial resources (e.g., an online trading account) once a year for tax purposes and the account access would typically expire on or before the April 15th U.S. tax filing deadline. As another example, monitoring module 106 may determine if access token 218 was previously in a hibernation state (e.g., the token has been cached by relying party 216 after not having been used for an extended period) but is now being used by relying party 216. As another example, monitoring module 106 may determine if relying party 216 has made a request to refresh access token 218 without notifying the delegating user of computing device 202. In some embodiments, the heuristics described above, in addition to other heuristics and/or machine-learning mechanisms, may be utilized to build a model for monitoring access token usage and detecting misuse.

Additionally or alternatively, monitoring module 106 may analyze access token usage data 124 by detecting whether the use of access token 218 by relying party 216 includes use of a privilege outside of a set of use privileges. For example, monitoring module 106 may, based on a query of access token usage logs 212 and utilizing one or more heuristics, detect if relying party 216 is utilizing access token 218 for more than what is needed based on a privilege model. In this example, monitoring module 106 may identify a service being provided by relying party 216 to determine a set of use privileges needed by relying party 216. Thus, any privileged uses outside of the privilege set may be deemed unnecessary. For example, an online appliance automation cloud platform service may request access token 218 from a user of computing device 202 to access temperature data for an oven for use as a trigger (e.g., the oven temperature is over 65 degrees) to determine when to automatically turn off the oven. Thus, in this example, monitoring module 106 may determine the set of use privileges for the online appliance automation cloud platform to include turning off an appliance (e.g., an oven) based on temperature data. Based on the aforementioned set of user privileges, monitoring module 106 may determine that any additional actions taken by the online appliance automation cloud platform (e.g., accessing the appliance's temperature history or turning the appliance on) would be outside of the set of user privileges. In some embodiments, the heuristics described above, in addition to other heuristics and/or machine-learning mechanisms, may be utilized to build a privilege model for monitoring access token usage and detecting misuse.

Additionally or alternatively, monitoring module 106 may analyze access token usage data 124 by detecting whether the use of access token 218 by relying party 216 includes a potential use of access token 218 by an additional unauthorized party. For example, monitoring module 106 may, based on a query of access token usage logs 212, may determine whether access token 218 is bound to more than a single owner (e.g., owners other than relying party 216). In this example, monitoring module 106 may, using heuristics, determine whether a security breach is associated with relying party 216 (e.g., based on knowledge of security incidents currently affecting computing devices in network 204) and detect the source of a resource using access token 218 for irregularities such as an abnormal IP address (e.g., an IP address that is not associated with relying party 216), a reputation check of the source identifying a malicious actor (e.g., malware), etc. By utilizing the aforementioned heuristics, the monitoring module 106 may be able to determine whether access token 218 is being used by other entities than relying party 216.

Figure 4:
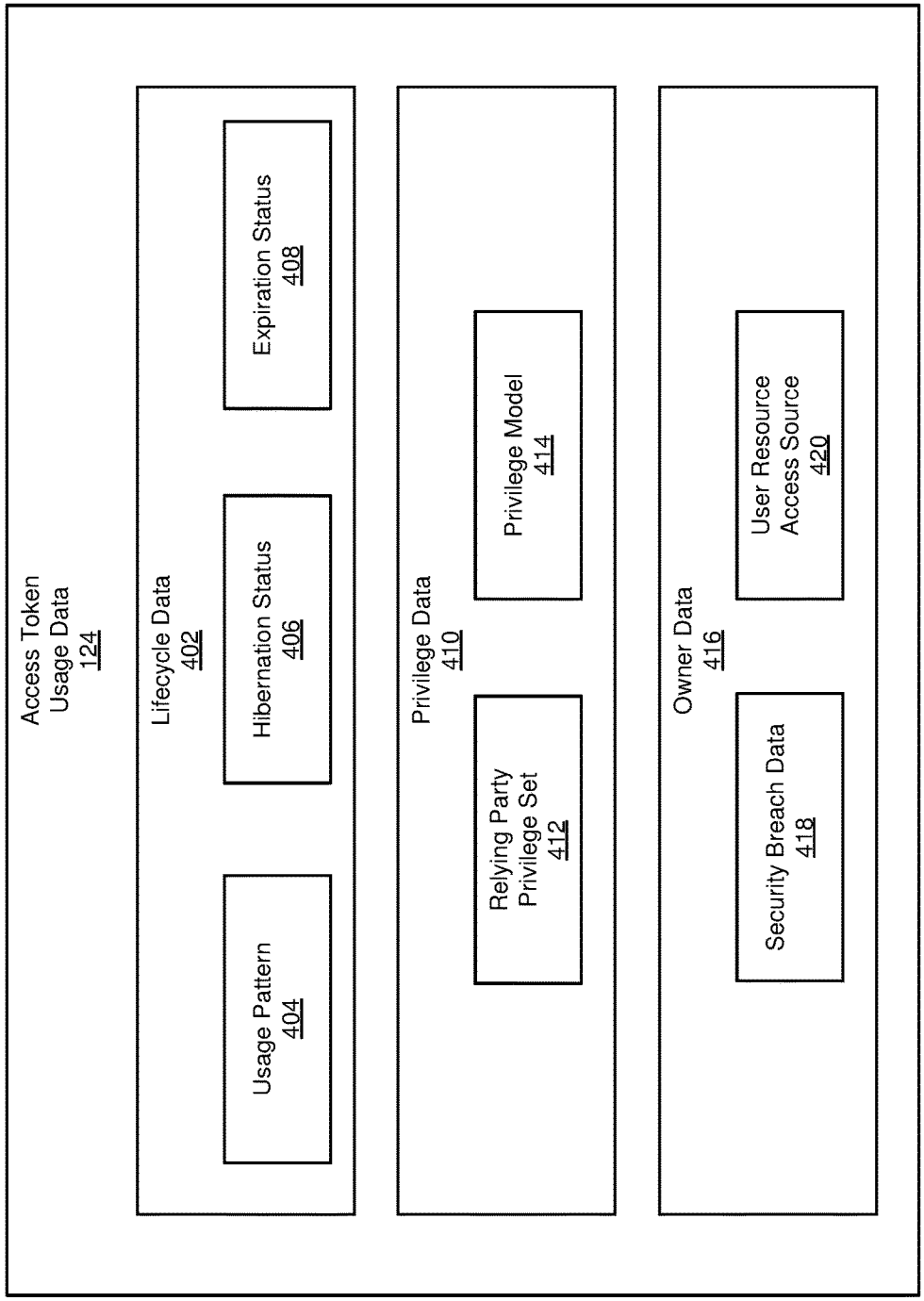
FIG. 4 is a block diagram of access token usage data in an example system for detecting misuse of online service access tokens.

As discussed above, in some embodiments, monitoring module 106 may monitor the usage of access token 218 by relying party 216 based on access token usage data 124. FIG. 4 is a block diagram of access token usage data 124. As illustrated in FIG. 4, access token usage data 124 may include lifecycle data 402 that may include usage pattern 404, hibernation status 406, and expiration status 408. In some examples, monitoring module 106 may analyze lifecycle data 402 to determine whether access token 218 is being misused based on one or more of usage pattern 404, hibernation status 406, and expiration status 408, as discussed above at step 304 in FIG. 3.

In some examples, access token usage data 124 may also include privilege data 410 that may include relying party privilege set 412 and privilege model 414. In some embodiments, monitoring module 106 may analyze privilege data 410 to determine whether access token 218 is being misused based on relying party privilege set 412 and/or privilege model 414, as discussed above at step 304 in FIG. 3.

In some embodiments, access token usage data 124 may also include owner data 416 that may include security breach data 418 and user resource access source 420. In some examples, monitoring module 106 may analyze owner data 416 to determine whether access token 218 is being misused based on security breach data 418 and user resource access source 420, as discussed above at step 304 in FIG. 3.

Returning to FIG. 3, at step 306, one or more of the systems described herein may identify, based on the usage data, activity associated with the access token being misused by the relying party. For example, identification module 108 may, as part of computing device 202 in FIG. 2, determine based on access token usage data 124, access token misuse activity 126 associated with access token 218 being misused by relying party 216.

Identification module 108 may identify access token misuse activity 126 in a variety of ways. In some examples, identification module 108 may identify access token misuse activity 126 when monitoring module 106, at step 304, detects that access token 218 is being utilized by relying party 216 in a way that exceeds a token use threshold. For example, identification module 108 may determine that access token 218 has been utilized 20 times in a 12-month period by a service identified as only needing access token 218 once per year. Additionally, or alternatively, identification module 108 may determine that access token 218 is suddenly being used again after being in hibernation without a new request from relying party 216 for a new access token. Additionally, or alternatively, identification module 108 may determine that relying party 216 has spontaneously requested online services 208 to refresh access token 218 just before access token 218 is set to expire.

Additionally or alternatively, identification module 108 may identify access token misuse activity 126 when monitoring module 106, at step 304, detects that relying party 216 has added additional use privileges for access token 218 beyond a previously established privilege for using access token 218. Additionally or alternatively, identification module 108 may identify access token misuse activity 126 when monitoring module 106, at step 304, detects a security breach associated with use of access token 218 by relying party 216.

Figure 5:
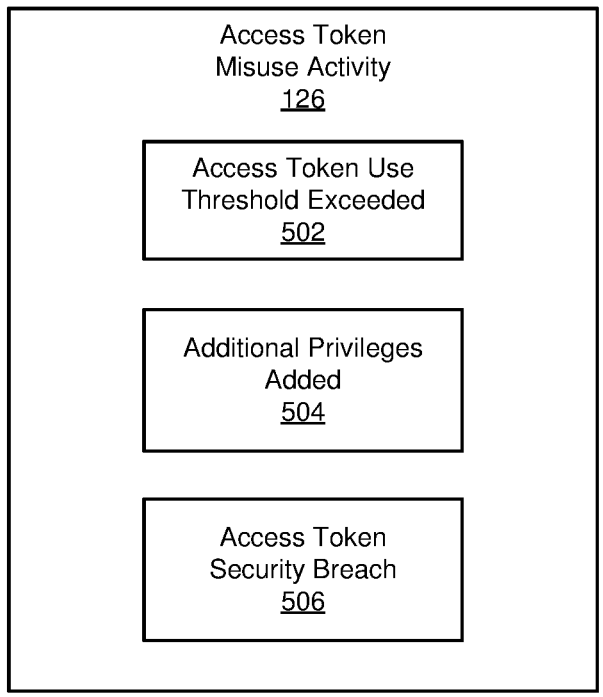
FIG. 5 is a block diagram of access token misuse activity in an example system for detecting misuse of online service access tokens.

FIG. 5 is a block diagram of access token misuse activity 126. As illustrated in FIG. 5, access token misuse activity 126 may include access token use threshold exceeded 502, additional privileges added 504, and access token security breach 506. In some examples, access token use threshold exceeded 502 may be associated with misuse activity by relying party 216 including using access token 218 more than an expected number of uses over a predetermined period, using access token 218 from a previous hibernation state, and requests to refresh access token 218 just prior to token expiration. In some embodiments, additional privileges added 504 may be associated with misuse activity by relying party 216 including using access token 218 in more usage categories than previously determined to be needed by a service associated with relying party 216. In some examples, access token security breach 506 may be associated with misuse activity by relying party 216 including relying party 216 losing access token 218 to another party based on malicious activity.

Returning to FIG. 3, at step 308, one or more of the systems described herein may perform a security action that protects the user resources against the activity associated with the access token being misused by the relying party. For example, security module 110 may, as part of computing device 202 in FIG. 2, perform a security action that protects user resources 210 against access token misuse activity 126 associated with access token 218 being misused by relying party 216.

Security module 110 may perform the security action in a variety of ways. In some examples, security module 110 may revoke and/or disable access token 218 issued to relying party 216. For example, security module 110 may revoke access token 218 when access token 218 has exceeded a predetermined token use threshold (e.g., relying party 216 is using access token multiple times over a period of time based on a predetermined one-time use). In this example, security module 110 may send a request message to a user of computing device 202 to receive authorization to revoke access token 218 from relying party 216 on behalf of the user. In other examples, security module 110 may automatically revoke access token 218 from relying party 216.

Additionally or alternatively, security module 110 may revoke or disable access token 218 when relying party 216 has a security breach such that a potential attacker may be able to illicitly obtain access token 218. In this example, security module 110 may obtain authorization from a user of computing device 202 to disable/revoke access token 218 such that, even if the potential attacker has gained token access, access token 218 will not be able to be utilized for malicious activity. In other examples, security module 110 may automatically disable/revoke access token 218.

As explained in connection with method 300 above, the systems and methods described herein detect online token abuse by monitoring, in real-time, online services that manage the digital and physical resources of a user and query online token usage data to detect any suspicious token uses regarding the user. By focusing on various aspects of online token usage (e.g., OAuth token usage) including token lifecycle, token permissions, and token ownership in view of how the tokens are being used by a relying party, the systems described herein may be able to quickly detect online token misuse and may also be able to protect users against attackers accessing their online resources by isolating and/or removing any tokens being misused. In some embodiments, the systems described herein may also be extended to protect online service accounts in addition to access tokens (e.g., to detect theft of user online accounts, etc.).

Figure 6:
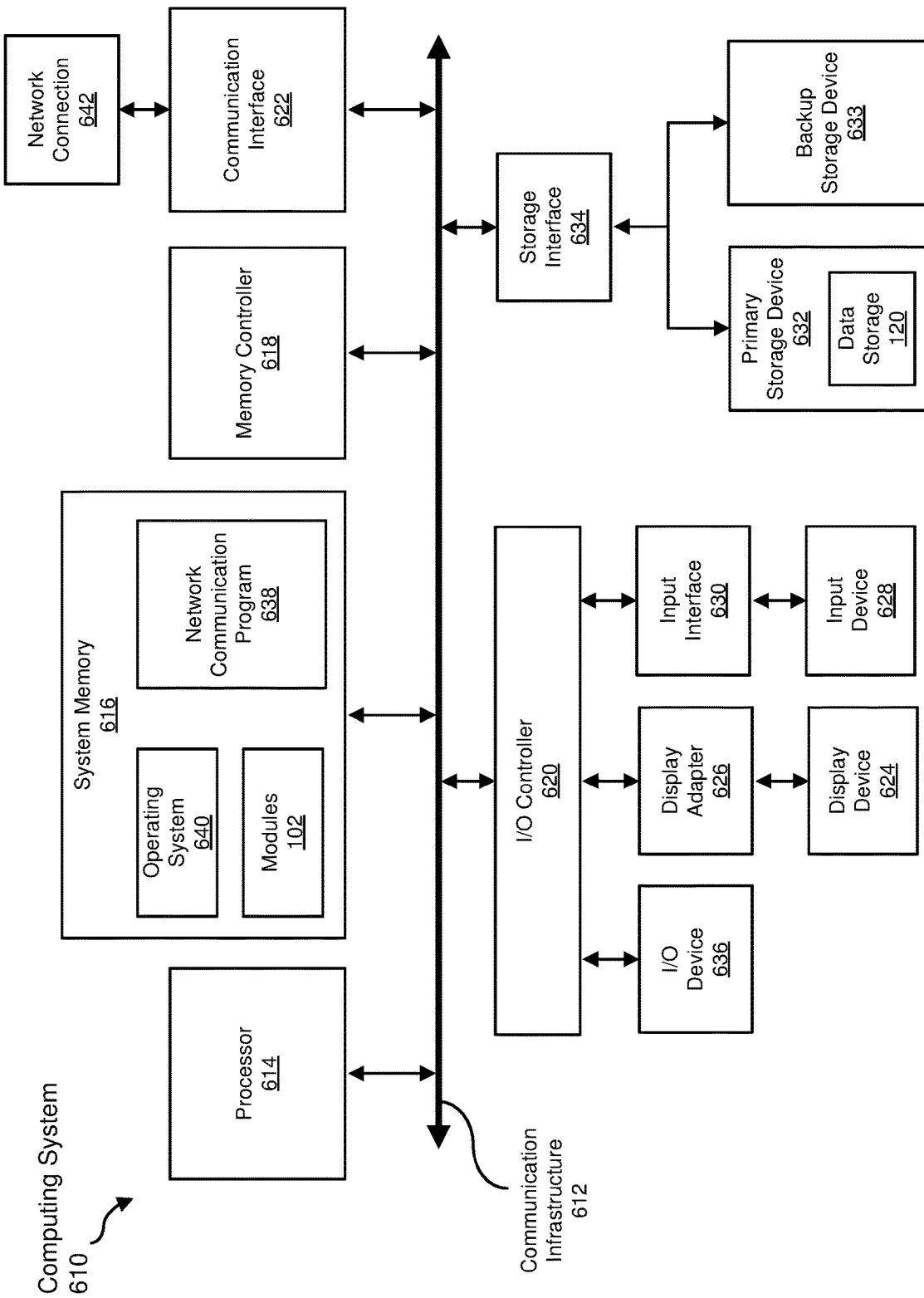
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
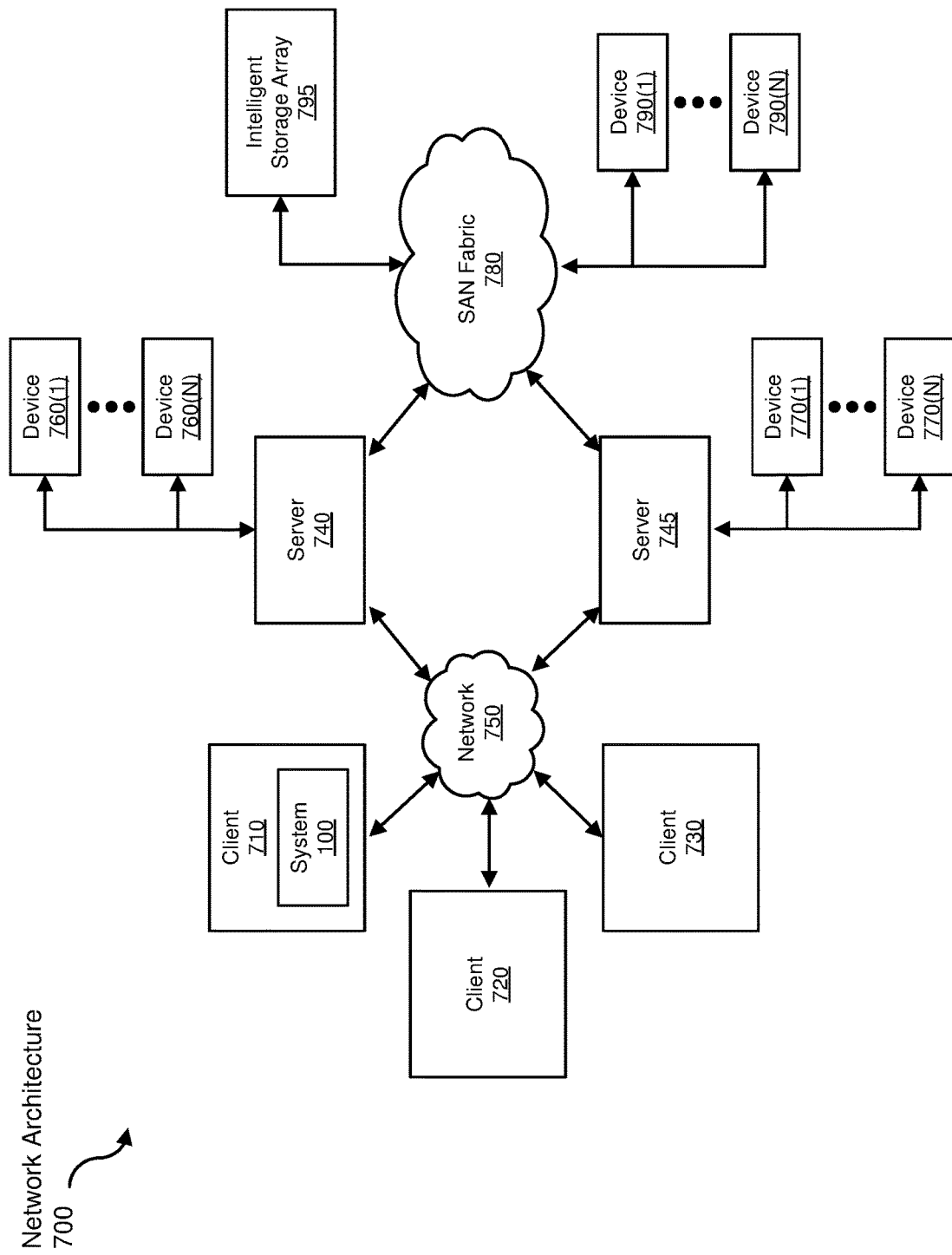
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting misuse of online service access tokens.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting misuse of online service access tokens, at least a portion of the method being performed by one or more computing devices comprising at least one processor, the method comprising:
   receiving, by the one or more computing devices, a user permission token to access an online service that manages one or more user resources;
   monitoring, by the one or more computing devices, based on utilization of the user permission token, usage data associated with an access token issued to a relying party, wherein the access token comprises an authorization protocol granting the relying party access to the user resources managed by the online service without sharing credentials, and wherein monitoring the usage data comprises:
      generating a query to the online service for the usage data; and
      performing an analysis of the usage data to detect one or more suspicious uses of the access token, wherein the analysis comprises detecting, utilizing one or more heuristics, whether a use of the access token by the relying party includes use of a privilege outside of a set of use privileges in a privilege model associated with the relying party;
   identifying, by the one or more computing devices and based on the usage data, activity associated with the access token being misused by the relying party; and
   performing, by the one or more computing devices, a security action that protects the user resources against the activity associated with the access token being misused by the relying party.

2. The computer-implemented method of claim 1, wherein performing the security action comprises revoking the access token issued to the relying party.

3. The computer-implemented method of claim 1, wherein performing the security action comprises disabling the access token issued to the relying party.

4. The computer-implemented method of claim 1, wherein the query comprises a request for a usage log generated by the online service for the usage data.

5. The computer-implemented method of claim 1, wherein the query comprises a request for a callback from the online service upon the access token being used by the relying party.

6. The computer-implemented method of claim 1, wherein the analysis of the usage data further comprises at last one of:
    detecting whether the use of the access token by the relying party exceeds a use threshold associated with a predetermined usage pattern; and
    detecting whether the use of the access token by the relying party includes a potential use of the access token by an additional unauthorized party.

7. The computer-implemented method of claim 6, wherein the use threshold is based on at least one of:
    a predetermined number of uses of the access token;
    an expiration date associated with the access token; and
    a hibernation state associated with the access token.

8. The computer-implemented method of claim 1, wherein the activity associated with the access token being misused by the relying party comprises at least one of:
    exceeding a predetermined lifecycle associated with the access token;
    accessing additional privileges beyond a predetermined set of privileges associated with the access token; and
    determining a security breach associated with an exclusive use of the access token by the relying party.

9. The computer-implemented method of claim 1, wherein the user permission token comprises a restricted use token limited to querying the online service for the usage data.

10. The computer-implemented method of claim 1, wherein the online service comprises at least one of:
    a digital resource online management service; and
    a physical resource online management service.

11. A system for detecting misuse of online service access tokens, the system comprising:
    at least one physical processor;
    physical memory comprising a plurality of modules and computer-executable instructions that, when executed by the physical processor, cause the physical processor to:
        receive, by a receiving module, a user permission token to access an online service that manages one or more user resources;
        monitor, by a monitoring module, based on utilization of the user permission token, usage data associated with an access token issued to a relying party, wherein the access token comprises an authorization protocol granting the relying party access to the user resources managed by the online service without sharing credentials, and wherein usage data is monitored by:
            generating a query to the online service for the usage data; and
            performing an analysis of the usage data to detect one or more suspicious uses of the access token, wherein the analysis comprises detecting, utilizing one or more heuristics, whether a use of the access token by the relying party includes use of a privilege outside of a set of use privileges in a privilege model associated with the relying party for accessing the user resources managed by the online service;
        identify, by an identification module, based on the usage data, activity associated with the access token being misused by the relying party; and
        perform, by a security module, a security action that protects the online service account against the activity associated with the access token being misused by the relying party.

12. The computer-implemented method of claim 4, wherein the usage log is maintained by the online service and includes the usage data associated with the access token.

13. The system of claim 11, wherein the security module performs the security action by revoking the access token issued to the relying party.

14. The system of claim 11, wherein the security module performs the security action by disabling the access token issued to the relying party.

15. The system of claim 11, wherein the query comprises a request for a usage log generated by the online service for the usage data.

16. The system of claim 11, wherein the query comprises a request for a callback from the online service upon the access token being used by the relying party.

17. The system of claim 11, wherein the analysis of the usage data comprises at last one of:
    detecting whether the use of the access token by the relying party exceeds a use threshold associated with a predetermined usage pattern; and
    detecting whether the use of the access token by the relying party includes a potential use of the access token by an additional unauthorized party.

18. The system of claim 17, wherein the use threshold is based on at least one of:
    a predetermined number of uses of the access token;
    an expiration date associated with the access token; and
    a hibernation state associated with the access token.

19. The system of claim 15, wherein the usage log is maintained by the online service and includes the usage data associated with the access token.

20. A non-transitory computer-readable medium comprising one or more computer-executable instructions that, when executed by at least one processor of one or more computing devices, cause the one or more computing devices to:
    receive a user permission token to access an online service that manages one or more user resources;
    monitor, based on utilization of the user permission token, usage data associated with an access token issued to a relying party, wherein the access token comprises an authorization protocol granting the relying party access to the user resources managed by the online service without sharing credentials, and wherein the usage data is monitored by:
        generating a query to the online service for the usage data; and
        performing an analysis of the usage data to detect one or more suspicious uses of the access token, wherein the analysis comprises detecting, utilizing one or more heuristics, whether the use of the access token by the relying party includes use of a privilege outside of a set of use privileges in a privilege model associated with the relying party for accessing the user resources managed by the online service;
    identify, based on the usage data, activity associated with the access token being misused by the relying party; and
    perform a security action that protects the user resources against the activity associated with the access token being misused by the relying party.

* * * * *